(12) United States Patent
Armstrong

(10) Patent No.: US 12,409,695 B2
(45) Date of Patent: Sep. 9, 2025

(54) VEHICLE SUSPENSION ENERGY RECLAMATION GENERATOR

(71) Applicant: Larry D. Armstrong, Eufaula, OK (US)

(72) Inventor: Larry D. Armstrong, Eufaula, OK (US)

( * ) Notice: Subject to any disclaimer, the term of this patent is extended or adjusted under 35 U.S.C. 154(b) by 0 days.

(21) Appl. No.: 18/938,771

(22) Filed: Nov. 6, 2024

(65) Prior Publication Data

US 2025/0058595 A1  Feb. 20, 2025

Related U.S. Application Data

(63) Continuation-in-part of application No. 18/747,828, filed on Jun. 19, 2024, now abandoned, which is a continuation-in-part of application No. 18/166,456, filed on Feb. 8, 2023, now abandoned.

(51) Int. Cl.
  *B60G 13/14* (2006.01)
(52) U.S. Cl.
  CPC .......... *B60G 13/14* (2013.01); *B60G 2300/60* (2013.01)
(58) Field of Classification Search
  CPC ........................ B60G 13/14; B60G 2300/60
  See application file for complete search history.

(56) References Cited

U.S. PATENT DOCUMENTS

| | | |
|---|---|---|
| 3,507,580 A | 4/1970 | Howard et al. |
| 3,799,481 A | 3/1974 | Anderson |
| 3,921,746 A | 11/1975 | Lewus |
| 3,980,152 A | 9/1976 | Manor |
| 4,018,052 A | 4/1977 | Laussermair |
| 4,098,083 A | 7/1978 | Carman |
| 4,098,144 A | 7/1978 | Besel et al. |
| 4,223,532 A | 9/1980 | Shiber |
| 4,295,538 A | 10/1981 | Lewus |

(Continued)

FOREIGN PATENT DOCUMENTS

JP  2012062884 A  *  3/2012

OTHER PUBLICATIONS

JP2012062884A_translate (Year: 2012).*

(Continued)

*Primary Examiner* — Oluseye Iwarere
*Assistant Examiner* — Mohammed Ahmed Qureshi
(74) *Attorney, Agent, or Firm* — HULSEY P.C.

(57) ABSTRACT

A vehicle suspension energy reclamation generator for converting vertical movement of a vehicle in motion into electrical energy is disclosed. The vehicle suspension energy reclamation generator includes a vertically collapsible frame, a frame biasing spring configured to expand the frame to a normal height under a predetermined weight, and an electrical generator having a rotatable hollow generator shaft. One or more mounts attach the frame and the electrical generator between a vehicle chassis and a vehicle suspension system. At least one drive mechanism connects to the frame and the rotatable hollow generator shaft. The vertical movement of the vehicle suspension system of a vehicle in motion causes the frame to collapse and expand. The collapse and expansion of the frame imparts spinning motion on the rotatable hollow generator shaft via the at least one drive mechanism. The generator converts the vertical movement of the vehicle into electrical energy.

18 Claims, 8 Drawing Sheets

(56) References Cited

U.S. PATENT DOCUMENTS

| | | |
|---|---|---|
| 4,813,234 A | 3/1989 | Nikolaus |
| 4,888,949 A | 12/1989 | Rogers |
| 5,091,679 A | 2/1992 | Murty |
| 5,121,686 A | 6/1992 | Schonlau et al. |
| 5,495,912 A | 3/1996 | Gray, Jr. et al. |
| 5,505,527 A | 4/1996 | Gray, Jr. et al. |
| 5,507,144 A | 4/1996 | Gray, Jr. et al. |
| 5,570,286 A | 10/1996 | Margolis et al. |
| 5,579,640 A | 12/1996 | Gray, Jr. et al. |
| 5,887,674 A | 3/1999 | Gray, Jr. |
| 6,394,238 B1 | 5/2002 | Rogala |
| 6,575,484 B2 | 6/2003 | Rogala et al. |
| 6,695,590 B1 | 2/2004 | Rydin et al. |
| 6,712,166 B2 | 3/2004 | Rush et al. |
| 6,719,080 B1 | 4/2004 | Gray, Jr. |
| 6,841,970 B2 | 1/2005 | Zabramny |
| 6,920,951 B2 | 7/2005 | Song et al. |
| 7,087,342 B2 | 8/2006 | Song et al. |
| 7,261,171 B2 | 8/2007 | de la Torre et al. |
| 2002/0070510 A1 | 6/2002 | Rogala |
| 2003/0015846 A1 | 1/2003 | Rogala et al. |
| 2004/0206561 A1 | 10/2004 | Song et al. |
| 2006/0125325 A1 | 6/2006 | Beaulieu |
| 2008/0257626 A1 | 10/2008 | Carabelli et al. |
| 2009/0229902 A1 | 9/2009 | Stansbury, III |
| 2010/0006362 A1 | 1/2010 | Armstrong |
| 2010/0072760 A1 | 3/2010 | Anderson et al. |
| 2010/0207309 A1 | 8/2010 | Park |
| 2010/0244457 A1 | 9/2010 | Bhat et al. |
| 2022/0412328 A1 * | 12/2022 | Salvaryan ............... F03G 7/081 |

OTHER PUBLICATIONS

ACXE Spring; "Spring Calculator", retrieved on Jan. 24, 2023 from https://www.acxesspring.com.

Ahmadian, M.; "Active Control of Vehicle Vibration"; retrieved on Jan. 24, 2023 from https://www.sciencedirect.com/science/article/pii/B0122270851001934.

\* cited by examiner

VEHICLE SUSPENSION ENERGY RECLAMATION GENERATOR

CROSS-REFERENCE TO RELATED APPLICATIONS

The present application is a continuation-in-part of U.S. patent application Ser. No. 18/747,828, titled "VEHICLE SUSPENSION ENERGY RECLAMATION GENERATOR" filed on Jun. 19, 2024; which is a continuation-in-part of U.S. patent application Ser. No. 18/166,456, titled "Vehicle Suspension Energy Reclamation Generator", filed on Feb. 8, 2023; all which are incorporated herein in their entirety and referenced thereto.

BACKGROUND OF THE INVENTION

Field of the Invention

The present invention relates to vehicles, and in particular, relates to a vehicle suspension energy reclamation generator for converting vertical movement of a vehicle in motion i.e., vertical movement of a vehicle suspension into electrical energy.

Description of the Prior Art

Original Equipment Manufacturers (OEMs) of vehicles and accessories constantly push to make vehicles more fuel efficient. OEMs of fossil-fuel-only vehicles, hybrid vehicles and Electric vehicles (EV's) make improvements to improve their efficiency. For example, fossil-fuel-only vehicles include hundreds of improvements to the engine, transmission, exhaust and body design to improve their fuel efficiency. The hybrid vehicles combine one or more electric motors and a fossil fueled engine and typically reclaim kinetic energy through regenerative braking and batteries. The hybrid vehicles such as plug-in hybrid vehicles allow charging of the onboard batteries from an external power source. The EV's rely entirely on charging the batteries from an external power source and regenerative braking. Despite these advances, vehicles of all sorts remain less efficient than the theoretical maximum.

Irrespective of the type of technology used, each of the fossil-fuel-only vehicles, hybrid vehicles and EV's have very similar suspension systems. Each wheel is typically outfitted with at least one suspension spring i.e., a thick, hard to compress wound spring capable of holding up about a quarter of weight of the vehicle and its maximum payload, with a piston-based shock absorber in parallel with each other. Each of these provides part of the suspension function i.e., the spring returns the car to its normal position after a bump or bounce, and the shock absorber reduces the residual bouncing of the spring to help it settle into its normal position more quickly. Together, the suspension springs and the shock absorbers (dampers) form a low pass filter which blocks the higher frequency road noise (mechanical noise) from being transmitted from the road to a vehicle frame.

With the advent of additional suspension components that can be controlled by software executed by on-board microcontrollers, the traditional all-mechanical suspension systems have come to be known as "passive suspensions", and the newer systems with software-controlled components are referred to as "active suspensions". The active suspensions allow the on-board microcontroller to stiffened or soften the suspension dynamically, for ride preferences and for performance handling improvements. For example, some vehicles have active suspension systems that stiffen the suspension over the right front wheel when steering to the left at high speeds and stiffen the suspension over the left front wheel when steering to the right at high speeds to prevent the outside front wheel from "diving" down during a hard or fast turn. Diving causes the inside rear wheel to have less pressure on it, and therefore, less traction, which can lead to drift and slide of the vehicle. So, the active suspension feature improves cornering handling and ride comfort (riders experience less tilt towards the outside of the turn).

In all of the above suspension mechanisms, much of the energy "absorbed" by the suspension system is simply dissipated, and therefore wasted. This is a combination of energy which was stored during acceleration into kinetic energy, and its dissipation by the suspension system results in heat from friction in the dampers and/or distortion (compression and stretching) of the springs. Further, the unneeded vehicle movement during transit is a source of wasted energy which is expended by the vehicle's suspension system. Vertical movement of the vehicle due to wind, road imperfections, turning and braking is undesirable as it is uncomfortable for the person(s) driving and riding in the vehicle, and may damage freight or goods being carried by the vehicle.

Therefore, there is a need in the art to capture the energy "absorbed" by the suspension system, which is otherwise lost, and put the energy back into a storage system, which then can be converted back into kinetic energy by an appropriate motor matching the storage system.

SUMMARY OF THE INVENTION

It is an object of the present invention to provide a system or vehicle suspension energy reclamation generator for converting vertical movement of a vehicle in motion into electrical energy.

It is another object of the present invention to provide a system or vehicle suspension energy reclamation generator for capturing the energy "absorbed" by a vehicle suspension system and putting the energy back into a storage system.

It is another object of the present invention to provide a vehicle suspension energy reclamation generator having electrical generation, electric battery energy storage, and electric motor system for converting to useful kinetic energy at a vehicle suspension system.

In order to overcome one or more objects, the present invention presents a system or vehicle suspension energy reclamation generator for converting vertical movement of a vehicle in motion into electrical energy. The vehicle suspension energy reclamation generator includes a vertically collapsible frame with a frame bias spring (or biasing spring) to expand the vertically collapsible frame to a normal height under a predetermined weight. The vertically collapsible frame mounts between a shortened suspension spring and a vehicle's chassis. The frame biasing spring is compressed when the vehicle bounces up and down during travel. The vertically collapsible frame connects to a rotatable hollow generator shaft or generator rod/rotatable shaft input, which in turn connects to an electrical generator. The electrical generator is rotated by one or more clutches or drive shafts (drive mechanisms) that operate in response to the collapsing and re-expanding of the vertically collapsible frame. An output of the electrical generator is stored in a battery to be used by an electric motor or electric accessories.

In one embodiment, the electrical generator includes optional fly weights. The fly weights are used to keep the rotation of the rotatable hollow generator shaft relatively constant during transition between collapsing and re-expanding phases, and vice versa. The generator converts the vertical movement of the vehicle into electrical energy for propelling the vehicle before the energy generated by the vertical movement of the vehicle gets dissipated during operation.

In one aspect of the invention, the system captures and reclaims regenerative energy and kinetic energy before the coil spring suspension can absorb it. The system achieves the reclamation of the kinetic energy stored in the vehicle's mass due to its forward motion, as well as the regenerative energy available from the electrical components.

In one advantageous feature of the present invention, the system is designed to collect energy from the vertical movement of a vehicle in motion from an access point of the suspension springs. As known, most suspension springs are designed and "sized" (e.g., force level required to compress them) so that they compress 2" to 5" during normal operation under normal payload amounts of the vehicle. In one example, the presently disclosed frame biasing spring replaces a typical suspension spring with one which is a few inches (2" to 5") shorter in its normal (uncompressed, unstretched) state, but otherwise, the replacement spring has the same strength as the original spring. In series with the replacement spring, such as on top of it (preferably), or optionally below it or even in the middle of two partial springs, the frame biasing spring works with the frame having a collapsible and stretchable mechanism under force by vertical movement of the vehicle, and helps to generate energy, such as electricity.

In another advantageous feature of the present invention, the generator mechanism having the biasing spring is designed to collapse and stretch under significantly less force than the force required to compress and stretch the replacement spring so that the generator mechanism can be operated before the spring is engaged. In this manner, what can be considered the first few inches of suspension movement result in operation of the generator, not the springs, and subsequent additional inches of movement are filtered by the spring and a shock absorber.

The features and advantages of the invention here will become more apparent in light of the following detailed description of selected embodiments, as illustrated in the accompanying FIGURES. As will be realized, the invention disclosed is capable of modifications in various respects, all without departing from the scope of the invention. Accordingly, the drawings and the description are to be regarded as illustrative in nature.

DETAILED DESCRIPTION OF THE INVENTION

The following detailed description set forth below in connection with the appended drawings is intended as a description of exemplary embodiments in which the presently disclosed invention may be practiced. The term "exemplary" used throughout this description means "serving as an example, instance, or illustration," and should not necessarily be construed as preferred or advantageous over other embodiments. The detailed description includes specific details for providing a thorough understanding of the presently disclosed vehicle suspension energy reclamation generator. However, it will be apparent to those skilled in the art that the presently disclosed invention may be practiced without these specific details. In some instances, well-known structures and devices are shown in functional or conceptual diagram form in order to avoid obscuring the concepts of the presently disclosed vehicle suspension energy reclamation generator.

In the present specification, an embodiment showing a singular component should not be considered limiting. Rather, the invention preferably encompasses other embodiments including a plurality of the same component, and vice-versa, unless explicitly stated otherwise herein. Moreover, the applicant does not intend for any term in the specification to be ascribed an uncommon or special meaning unless explicitly set forth as such. Further, the present invention encompasses present and future known equivalents to the known components referred to herein by way of illustration.

Although the present invention provides a description of a system, it is to be further understood that numerous changes may arise in the details of the embodiments of the system. It is contemplated that all such changes and additional embodiments are within the spirit and true scope of this disclosure.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure.

Various features and embodiments of a vehicle suspension energy reclamation generator for converting vertical movement of a vehicle in motion into electrical energy are explained in conjunction with the description of FIGS. 1-9.

Figure 1:
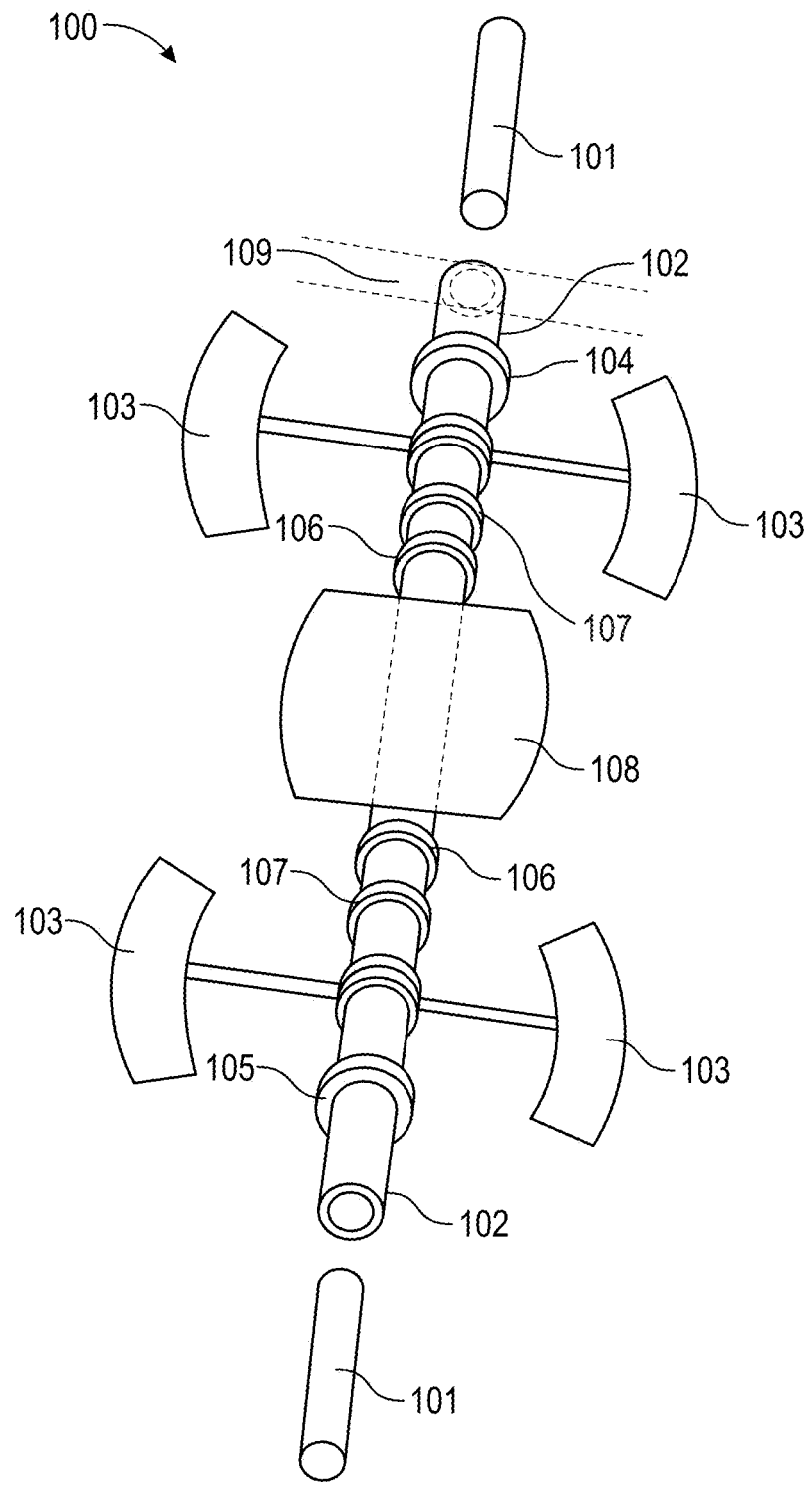
FIG. 1 depicts a vehicle suspension energy reclamation generator using at least one sprag drive or drive mechanism, in accordance with one embodiment of the present invention.
Figure 2:
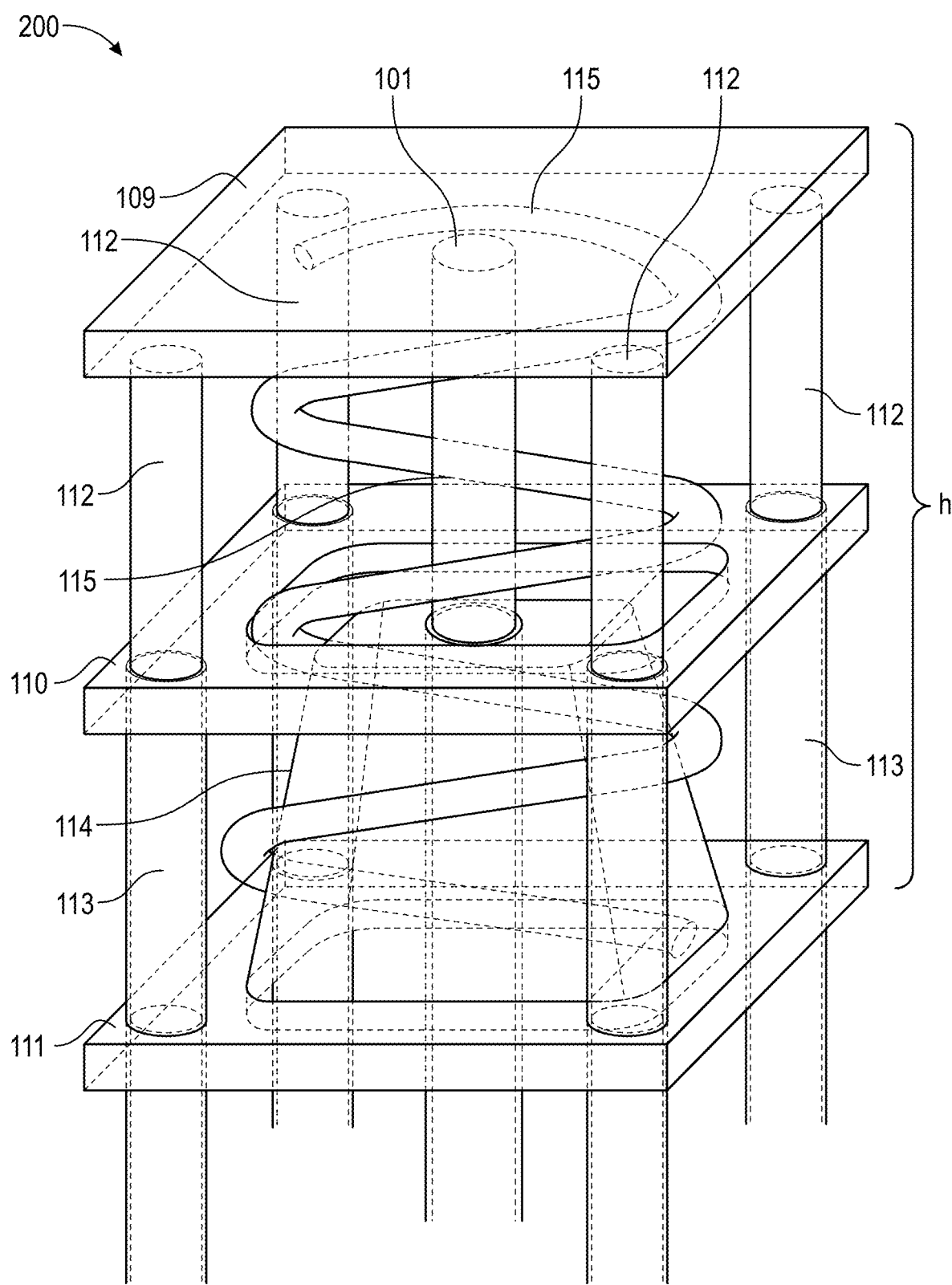
FIG. 2 depicts a vertically collapsible frame of the vehicle suspension energy reclamation generator, in accordance with one embodiment of the present invention.

FIG. 1 shows a vehicle suspension energy reclamation generator 100 for converting vertical movement of a vehicle in motion into electrical energy, in accordance with one embodiment of the present invention. Vehicle suspension energy reclamation generator 100 connects to a frame assembly 200. FIG. 2 shows a perspective view of frame assembly 200, in accordance with one embodiment of the present invention. Frame assembly 200 includes a plurality of plates such as a first plate 109, a second plate 110, and a third plate 111. First plate 109 indicates a top plate, second plate 110 indicates a center plate and third plate 111 indicates a bottom plate. First plate 109, second plate 110, and third plate 111 are positioned at a height h, as indicated in FIG. 2. Each of first plate 109, second plate 110, and third plate 111 is made of a suitable material and has a required strength. Each of first plate 109, second plate 110, and third plate 111 comes in a square or rectangular configuration. A person skilled in the art understands that it is possible to provide each of plates 109, 110, and 111 in round, oval or other shape without departing from the scope of the present invention.

Figure 3:
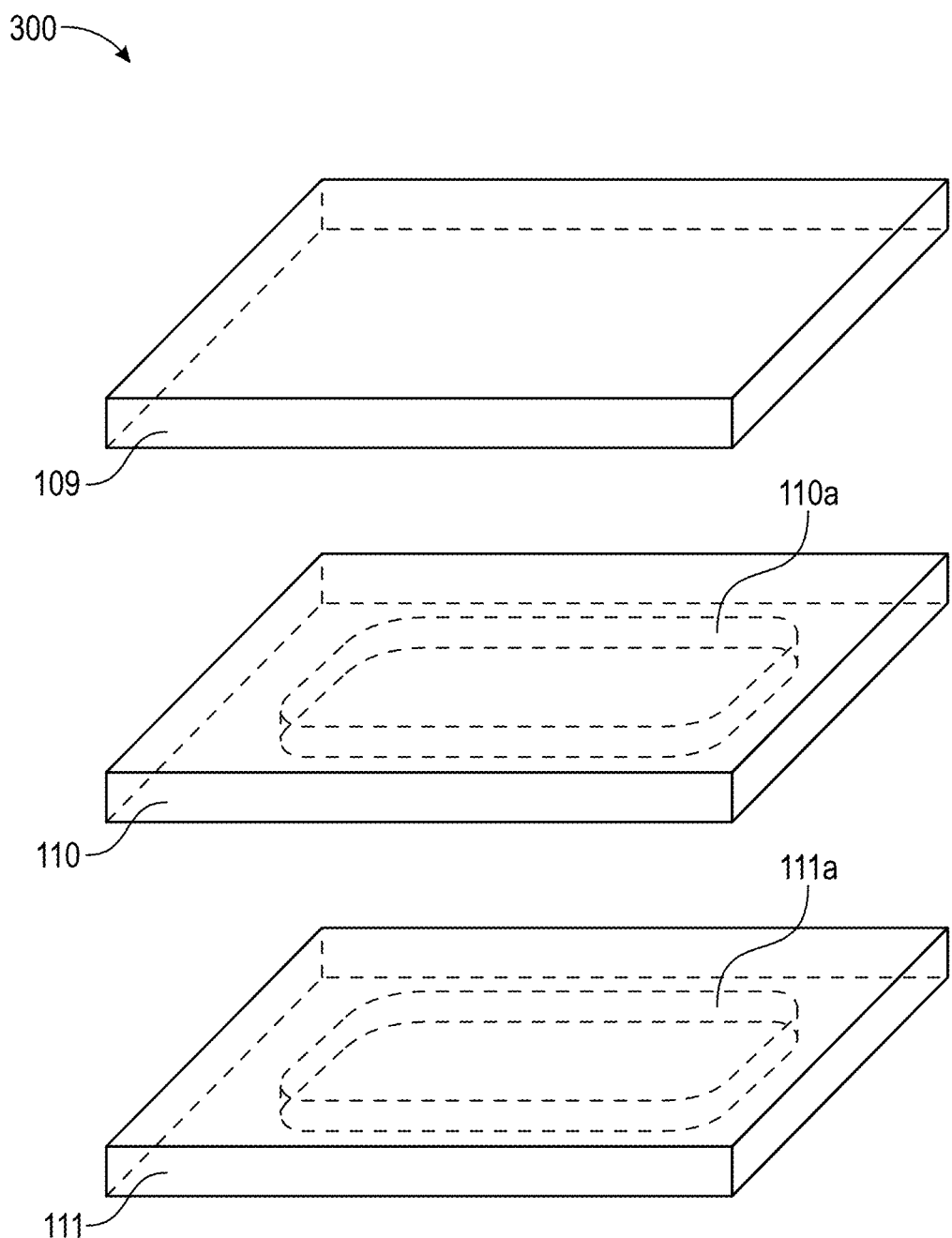
FIG. 3 illustrates three horizontal plates of the vertically collapsible frame, in accordance with one embodiment of the present invention.
Figure 4:
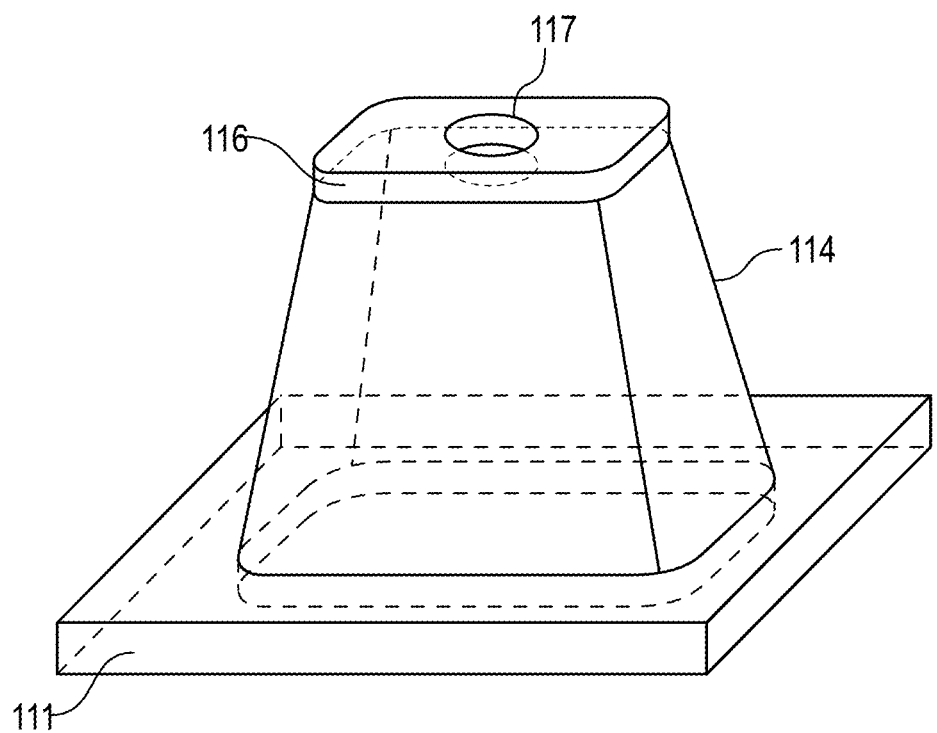
FIG. 4 is a perspective view of a housing extending from a bottom plate of the vertically collapsible frame, in accordance with one embodiment of the present invention.
Figure 5:
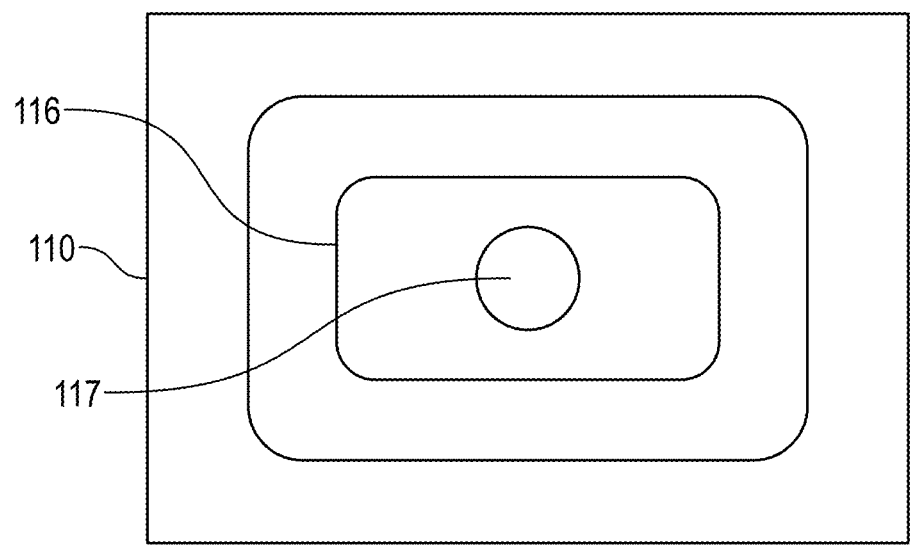
FIG. 5 is a top view of a center plate of the vertically collapsible frame receiving the housing, in accordance with one embodiment of the present invention.

FIG. 3 shows an exploded view of plates 300 i.e., first plate 109, second plate 110, and third plate 111, in accordance with one embodiment of the present invention. As can be seen, second plate 110 includes a first cut section 110a, and third plate 111 includes a second cut section 111a. First cut section 110a is configured to receive housing 114. FIG. 5 shows a top view of second plate 110 in which housing 114 draws through second plate 110 via first cut section 110a. Further, second cut section 111a in third plate 111 configures to receive a housing 114. FIG. 4 shows the feature of housing 114 placed in second cut section 111a. Housing 114 has a tapered section with reduced size as it goes up. At the top, housing 114 has a housing top surface 116 with an orifice 117 at the center for receiving drive shaft or drive mechanism 101.

Figure 7:
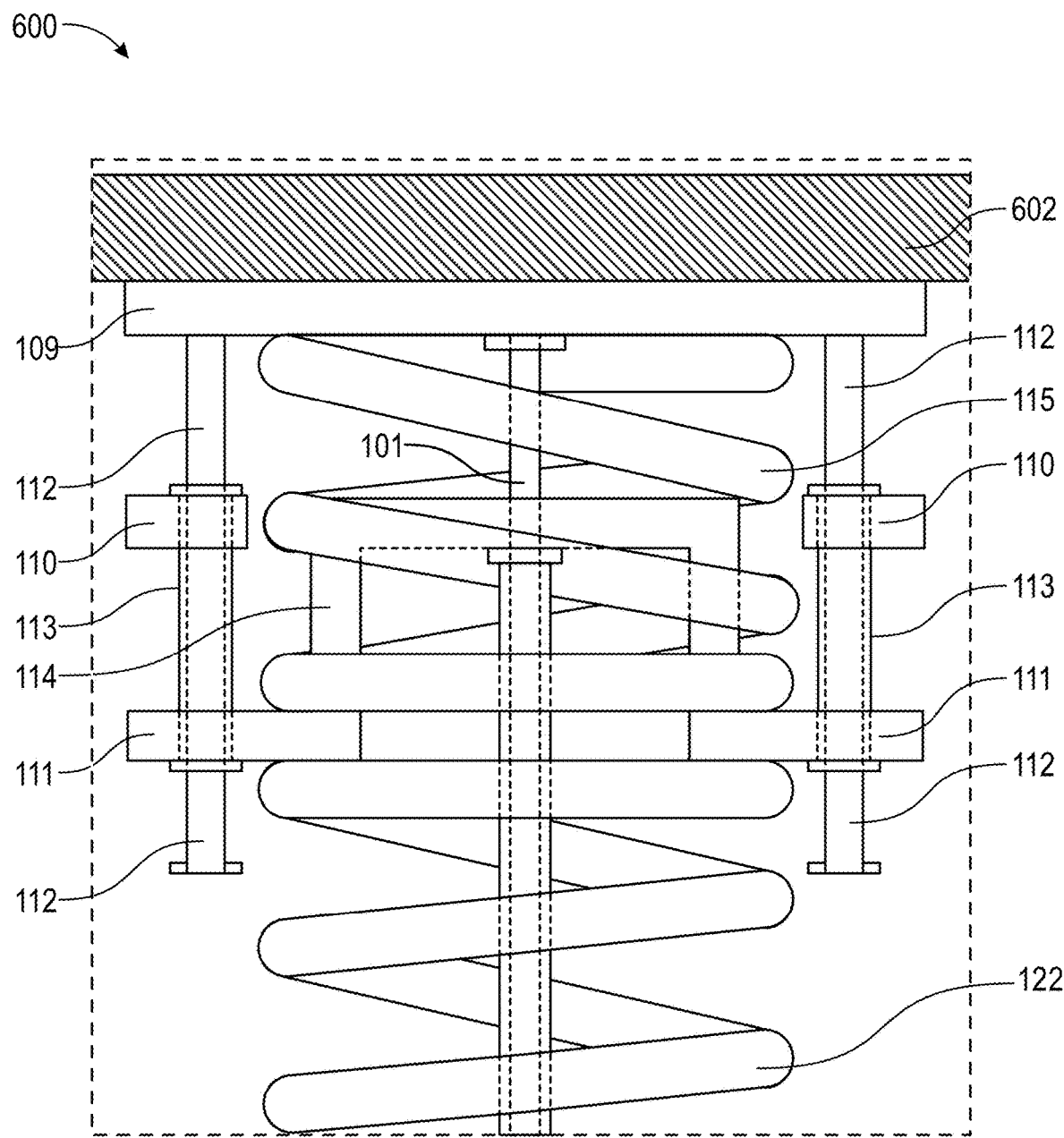
FIG. 7 illustrates the vehicle suspension energy reclamation generator with a frame biasing spring, in accordance with yet another embodiment of the present invention.
Figure 8:
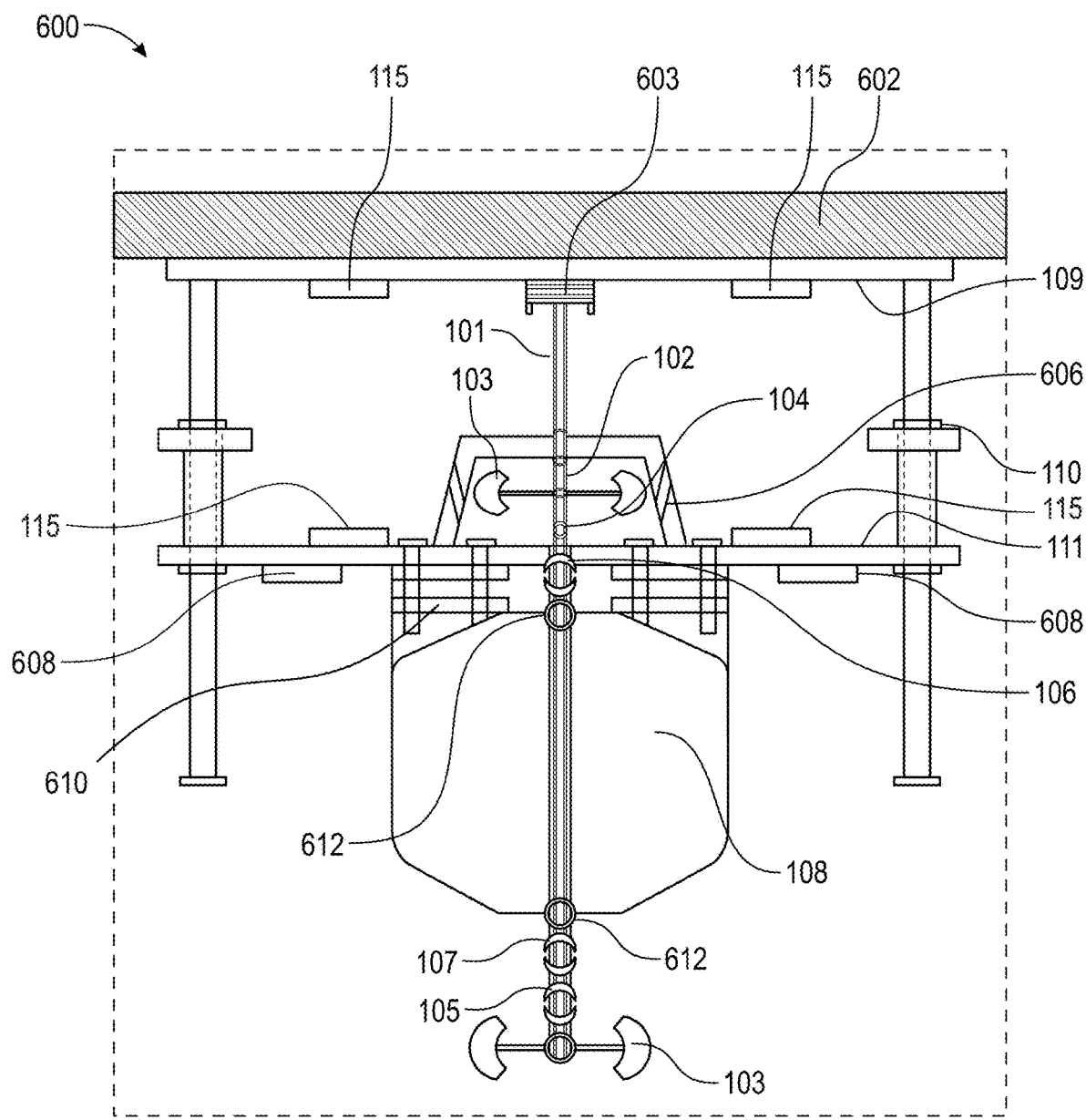
FIG. 8 illustrates the vehicle suspension energy reclamation generator, in accordance with yet another embodiment of the present invention.

Referring back to FIG. 2, housing 114 includes a series of guide bars 112 (collapsible vertical alignment guide bars). Guide bars 112 position in between first plate 109 and second plate 110. Further, frame assembly 200 includes a set of sleeves 113. Sleeves 113 position in between second plate 110 and third plate 111. Guide bars 112 are configured to pass through sleeves 113 making frame assembly 200 collapsible and expandable (re-expansion). In accordance with the present invention, frame assembly 200 includes a frame biasing spring 115. Frame biasing spring 115 rests on top of top surface of third plate 111, and is attached to an attachment plate 109, as shown in FIG. 7, for example. Frame biasing spring 115 is strong enough to hold a vehicle at its normal height prior to removal or replacement of an original vehicle suspension spring or replacement suspension spring (not shown). Here, frame biasing spring 115 positions first plate 109, second plate 110, and third plate 111 to a normal height h i.e., uncompressed and upstretched height h as indicated in FIG. 2.

Referring back to FIG. 1, vehicle suspension energy reclamation generator 100 includes sprag and generator rods (rotatable hollow generator shafts or simply hollow generator shaft) 102 connecting housing 114 at housing top surface 116. Here, hollow generator shaft 102 connects to a drive shaft or drive mechanism 101 via an attachment plate or mount 109. It should be understood that drive shaft or drive mechanism 101 is received into hollow generator shaft 102. Here, drive shaft or drive mechanism 101 indicates a sprag clutch drive that provides a unidirectional drive in an upward direction and a downward direction of linear movement. Vehicle suspension energy reclamation generator 100 includes a front bracket 104 attached to attachment plate or mount 109. Further, vehicle suspension energy reclamation generator 100 includes a rear bracket 105 attached to third plate 111. Further, vehicle suspension energy reclamation generator 100 includes first one-way spiral gears or first set of clutches 106 and second one-way spiral gears or second set of clutches 107. First set of clutches 106 and second set of clutches 107 position on hollow generator shaft 102 and spin a generator or alternator 108 in the same direction on both up strokes (expansion and decompression) and down strokes (compression and collapse) alike via sprag clutches (not shown). Further, vehicle suspension energy reclamation generator 100 includes weights and counterweights (fly weights) 103. Here, weights and counterweights 103 form a type of a flywheel which stores rotation energy in generator 108 to keep it spinning as collapsible frame assembly 200 transitions between collapse and expansion and vice versa.

FIG. 7 shows an exemplary embodiment of vehicle suspension energy reclamation generator 600 in which drive shaft or drive mechanism 101 connects to a car frame 602. As can be seen, drive shaft 101 connects to car frame 602 in which frame biasing spring 115 positions in between frame 602 and third plate 111. In one example, third plate 111 positions adjacent to vehicle suspension spring in that the spring illustrated below third plate 111 indicates the vehicle suspension spring. In one embodiment, frame biasing spring 115 has a lower coefficient for compression than the vehicle suspension spring. This allows the mechanism to collapse under downward pressure before the vehicle suspension spring is appreciably compressed. In operation, both frame biasing spring 115 and the vehicle suspension spring collapse simultaneously. Here, frame biasing spring 115 compresses more inches than the vehicle suspension spring by ratio of their strength coefficients until frame biasing spring 115 is completely compressed.

In order to connect vehicle suspension energy reclamation generator 600 to the vehicle, first plate 109 is attached to a suspension of a vehicle (in configurations with the generator mechanism above the replacement spring) allowing it to move freely up and down in reference to second plate 110 through a series of guide bars 112 passing through a set of sleeves 113 when the vehicle is moving up and down. Third plate 111 attaches to the top of the replacement suspension spring in a top-mount configuration.

In operation, as the vehicle travels, the vehicle bounces upward and downward. In the present embodiment, frame biasing spring 115 has a lower coefficient for compression than the replacement suspension spring, which allows the mechanism to collapse under downward pressure before the replacement suspension spring is appreciably compressed. In reality, two springs i.e., one frame biasing spring 115 and one replacement suspension spring collapse simultaneously, however, frame biasing spring 115 compresses more inches than the replacement suspension spring compresses by ratio of their strength coefficients until frame biasing spring 115 is completely compressed. During the downward, frame biasing spring 115 compresses, as a result first plate 109 is forced down towards second plate 110. As the vehicle bounces upwards, frame biasing spring 115 expands or even stretches, the plates i.e., first plate 109 and second plate 110 move away from each other, eventually settling back into the normal position when the vehicle is no longer in motion and no longer bouncing. As such, most of the initial 2" to 5" of suspension compression during operation is received into frame biasing spring 115, and very little is received into the replacement suspension spring.

FIG. 2 shows generator 103 placed in a vertical center configuration. Here, drive shaft or drive mechanism 101 is forced down and through hollow generator shaft 102 (shaft input) when plates 109 and 110 are moved towards each other, and the reverse as plates 109 and 110 are moved away from each other. In the present embodiment, hollow drive shaft or drive mechanism 101 presents a sprag clutch design which is forced (during collapse operation) through hollow generator shaft 102 having a number of sprag clutches attached to first set of clutches 106, and spins drive shaft 101 in a particular direction. As frame biasing spring 115 and/or vehicle movement forces drive shaft 101 back up to the normal, at-rest position (plates further apart), second set of clutches 107 which are in the reversed position of the first set of clutches 106 spin drive shaft 101 in the same direction. In this manner, both up and down movement (expansion and collapse) of the mechanism is rectified into a single direction of rotation of drive shaft 101. During the turn-around time between up and down motions and between down and up motions, generator 108 uses flywheel or weight-counterweights 103 to keep hollow generator shaft 102 spinning.

It should be understood that vehicle suspension energy reclamation generator 100, 600 is described to have frame assembly 200 and generator assembly i.e., drive shaft 101, hollow generator shaft 102, etc., in a coaxial configuration with the spring, such as being mounted inside the coil of the spring. However, those ordinarily skilled in the art will recognize that other mechanical configurations will result in the same operational benefits, such as mounting the generator mechanism outside the spring.

Figure 6:
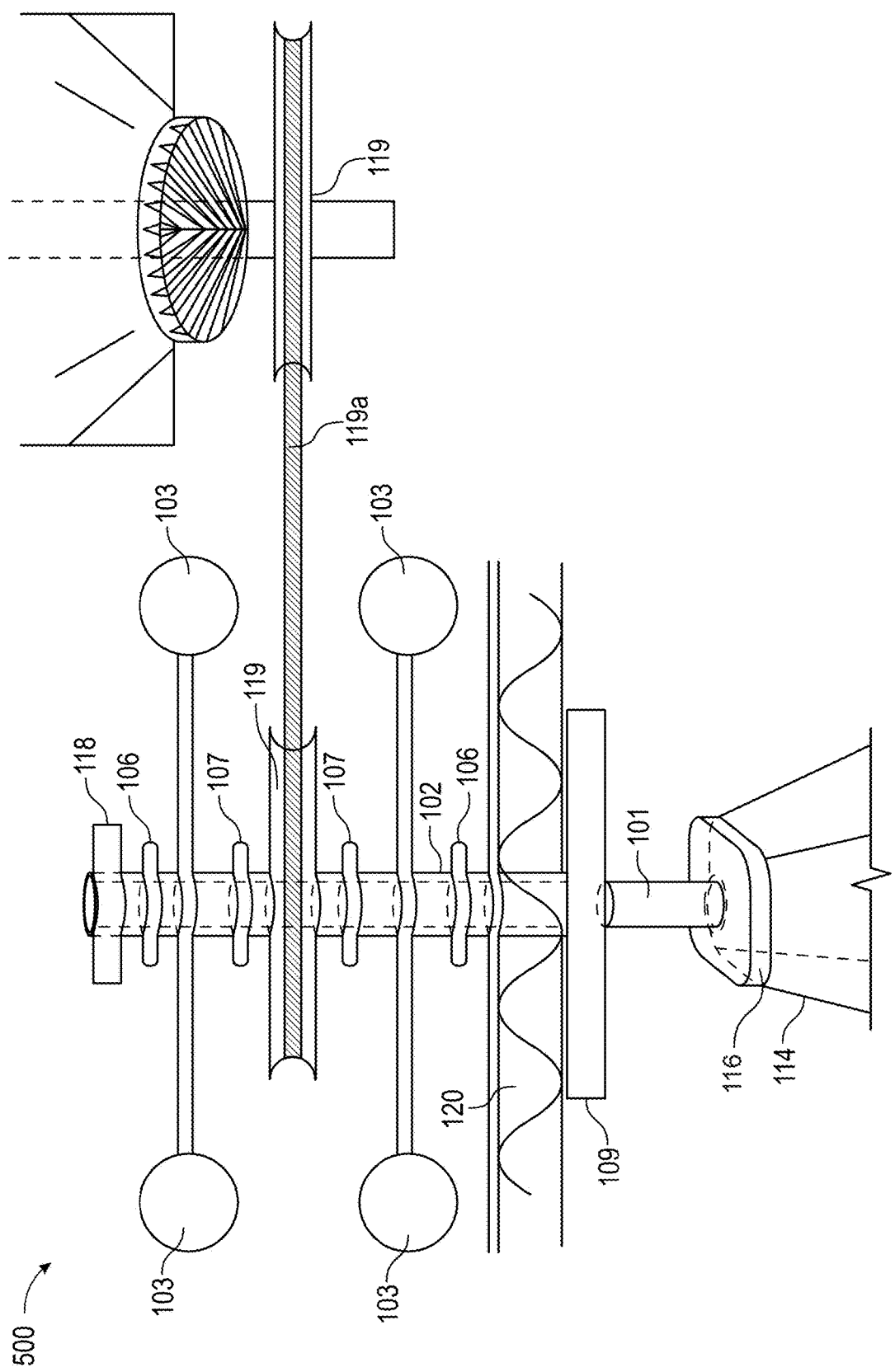
FIG. 6 shows a mounting configuration of the vehicle suspension energy reclamation generator with a conventional alternator, in accordance with another embodiment of the present invention.

FIG. 6 shows a vehicle suspension energy reclamation generator 500 mounted in another configuration, in accordance with one embodiment of the present invention. Here, sprag rods or drive shafts 101 pass through or past a vehicle suspension system. This is useful for applications where the generator assembly cannot fit into a shorter or narrower original equipment manufacturing spring height. In such cases, the current configuration is achieved by attaching drive shaft 101 at a plate 116, that is protruding from third plate 111. This allows the sprag rod or drive shaft 101 to be forced upward through the vehicle frame, spinning hollow generator shaft 102 on top of the frame. Further, hollow generator shaft 102 connects to a conventional alternator 119 via a pulley system 119a.

FIG. 7 shows vehicle suspension energy reclamation generator 600, in accordance with another embodiment of the present invention. Here, vehicle suspension energy reclamation generator 600 includes drive shaft 101 connecting car frame 602 via a slip clutch 603. Third plate 111 includes coil spring brackets 608 for coil spring 122, and brackets between third plate 111 and first plate 109 for frame biasing spring 115. In one example, a venting 606 is provided. Further, vehicle suspension energy reclamation generator 600 includes a generator mounting 610 for receiving generator 108 underneath third plate 111. In some examples, vehicle suspension energy reclamation generator 600 includes bearing 612 for hollow generator shaft 102 to go through third plate 111. The embodiment shown herein can be used with electric vehicles for charging the batteries with the energy generated from generator 108.

Figure 9:
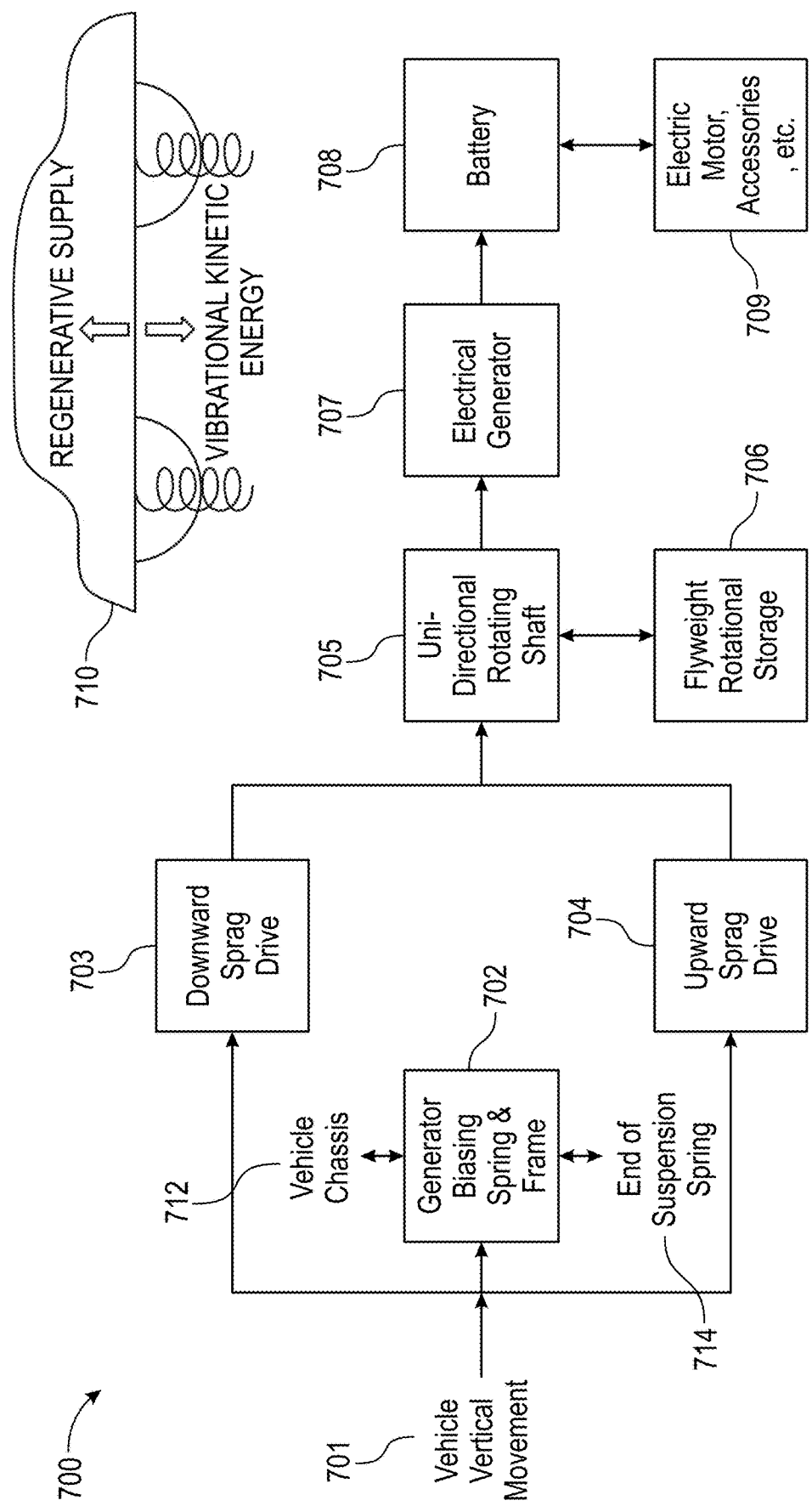
FIG. 9 is a functional block diagram of the system or vehicle suspension energy reclamation generator, in accordance with another embodiment of the present invention.

FIG. 9 shows a functional block diagram of vehicle suspension energy reclamation generator 700, in accordance with one embodiment of the present. Vehicle suspension energy reclamation generator 700 receives energy from mechanical vertical motion 701 of a vehicle. As specified above, vehicle suspension energy reclamation generator 700 includes generator biasing spring and frame elements 702 (similar to biasing spring 105). Generator biasing spring and frame elements 702 work in series with suspension spring 714 to provide support between an axle and a vehicle chassis 712. In some embodiments, the generator biasing spring and frame elements 702 positions above a shortened suspension spring 714 or below a shortened suspension spring, or in between two shortened suspension spring 714, or even beside a multi-stage suspension spring 714. In compression phases, a downward sprag drive 703 provides rotational force to spin a unidirectional rotating shaft 705. In expansion phases, an upward sprag drive 704 provides rotational force to spin unidirectional rotating shaft 705. Uni-directional rotating shaft 705 operates an electrical generator 707, and the electrical current output of electrical generator 707 is stored in one or more batteries (energy storage units) 708. In some embodiments, rotational energy generated by a unidirectional rotating shaft is stored in a flyweight rotational storage 706 (weights and counterweights). This is done to keep unidirectional rotating shaft 705 rotating speed fairly constant during transitions between upward and downward sprag drive phrases. Batteries 708 can then be used to power one or more electric motors, accessories, brakes, active suspension components 709, to offset and reduce the total energy consumption of the vehicle to increase its operational efficiency. In some embodiments, the kinetic energy captured from vibrations caused by automobile/vehicle 710 is provided as an input to electrical generator 707 for supplying electric current captured herein and powering the active suspension components 709 such as electric motors, accessories, brakes, etc.

The presently disclosed system provides several advantages over the prior art. For example, the vehicle suspension energy reclamation generator is configured to convert the energy absorbed by the suspension system into electrical energy. This way, the energy which is generally lost or unutilized is used for generating or producing the electrical energy. The electrical energy generated can be stored in an energy storage system for operating the components in the vehicle or engine, motor depending on the type of the vehicle or as per the need. For example, the energy stored can be converted back into kinetic energy by an appropriate motor matching the storage system. The system can be installed at the bottom of the vehicle without affecting the functionality of the vehicle. The generator can be used with fly weights to keep the generator shaft rotating relatively constant during the transition between the collapsing and re-expanding of the frame. This ensures the generator can be used for generating the electrical energy constantly as long as the vehicle is in motion and/or there is a vertical movement of the vehicle due to wind, road imperfections, turning and braking.

Further, the vehicle suspension energy reclamation generator powers the generator without placing a drag on the vehicle when compared to regenerative braking used in vehicles. In some examples, the vehicle suspension energy reclamation generator can be used to charge a vehicle while moving down the road without placing a drag on the vehicle or using any form of the energy. Even when the power is cut off to the vehicle, the vehicle suspension energy reclamation generator is able to continue to collect energy until the vehicle stops. The vehicle suspension energy reclamation generator can be used for slow charging of the battery without drag when the vehicle is driving down the road. As the vehicle suspension energy reclamation generator collects energy whenever the vehicle is on the move, it allows the use of fewer batteries to store the energy and thereby the weight of the batteries in the vehicle. Further, the vehicle suspension energy reclamation generator prevents overheating of the batteries.

A person skilled in the art appreciates that the vehicle suspension energy reclamation generator can come in a variety of shapes and sizes depending on the need. Further, many changes in the design and placement of components may take place without deviating from the scope of the presently disclosed vehicle suspension energy reclamation generator.

In the above description, numerous specific details are set forth such as examples of some embodiments, specific components, devices, methods, in order to provide a thorough understanding of embodiments of the present invention. It will be apparent to a person of ordinary skill in the art that these specific details need not be employed, and should not be construed to limit the scope of the invention.

In the development of any actual implementation, numerous implementation-specific decisions must be made to achieve the developer's specific goals, such as compliance with system-related and business-related constraints. Such a development effort might be complex and time-consuming, but may nevertheless be a routine undertaking of design, fabrication, and manufacture for those of ordinary skill. Hence as various changes could be made in the above constructions without departing from the scope of the invention, it is intended that all matter contained in the above description or shown in the accompanying drawings shall be interpreted as illustrative and not in a limiting sense.

The foregoing description of embodiments is provided to enable any person skilled in the art to make and use the invention. Various modifications to these embodiments will be readily apparent to those skilled in the art, and the novel principles and invention disclosed herein may be applied to other embodiments without the use of the innovative faculty. It is contemplated that additional embodiments are within the spirit and true scope of the disclosed invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A vehicle suspension energy reclamation generator for converting vertical movement of a vehicle in motion into electrical energy, said system comprising:
   a vertically collapsible frame, wherein said vertically collapsible frame is positioned between a vehicle chassis and a vehicle suspension system;
   a frame biasing spring configured to expand said vertically collapsible frame to a normal height under a predetermined weight;
   an electrical generator or alternator disposed into said vertically collapsible frame, wherein said electrical generator comprises a rotatable hollow generator shaft; and
   at least one drive mechanism connected to said vertically collapsible frame, wherein said at least one drive mechanism is inserted into said rotatable hollow generator shaft, wherein said at least one drive mechanism is configured to impart spinning motion on said rotatable hollow generator shaft in response to collapse and expansion of said vertically collapsible frame, and wherein said rotatable hollow generator shaft rotates said electrical generator to produce an electric energy.

2. The system of claim 1, wherein said vehicle suspension system comprises a vehicle replacement suspension spring, and wherein said frame biasing spring has a spring rate less than a spring rate of said vehicle replacement suspension spring.

3. The system of claim 2, wherein the normal height of said frame biasing spring and a height of said vehicle replacement suspension spring are equal to a height of an original suspension spring to be replaced.

4. The system of claim 1, wherein said at least one drive mechanism comprises at least one sprag clutch drive configured to provide a unidirectional drive to said at least one drive mechanism during collapse and expansion of said vertically collapsible frame.

5. The system of claim 1, wherein said vertically collapsible frame comprises vertically aligned plates connected by collapsible vertical alignment guide bars.

6. The system of claim 5, wherein said vertically collapsible frame further comprises sleeves, and wherein said collapsible vertical alignment guide bars insert in said sleeves and allow said vertically collapsible frame to collapse and expand.

7. The system of claim 5, wherein a plate of said plates comprises a housing, and wherein said housing comprises an orifice for drawing through said at least one drive mechanism.

8. The system of claim 1, wherein said electrical generator connects to fly weights, and wherein said fly weights cause said electrical generator to rotate constantly during transition between collapsing and expanding of said vertically collapsible frame.

9. The system of claim 1, further comprises an energy storage unit for storing the electrical energy.

10. A method of converting vertical movement of a vehicle in motion into electrical energy, said method comprising the steps of:
    providing a vertically collapsible frame, said vertically collapsible frame positioned between a vehicle chassis and a vehicle suspension system;
    disposing a frame biasing spring into said vertically collapsible frame for expanding said vertically collapsible frame to a normal height under a predetermined weight;
    disposing an electrical generator or alternator into said vertically collapsible frame, said electrical generator or alternator comprising a rotatable hollow generator shaft;
    providing at least one drive mechanism connected to said vertically collapsible frame;
    inserting said at least one drive mechanism in said rotatable hollow generator shaft; and
    imparting spinning motion on said rotatable hollow generator shaft by said at least one drive mechanism in response to collapse and expansion of said vertically collapsible frame such that said rotatable hollow generator shaft rotates said electrical generator for producing an electric energy.

11. The method of claim 10, further comprising providing a vehicle replacement suspension spring at said vehicle suspension system, said frame biasing spring having a spring rate less than a spring rate of said vehicle replacement suspension spring.

12. The method of claim 11, further comprising configuring said frame biasing spring and said vehicle replacement suspension spring such that the normal height of said frame biasing spring and the height of said vehicle replacement suspension spring are equal to a height of an original suspension spring to be replaced.

13. The method of claim 10, further comprising providing at least sprag clutch drive for providing unidirectional drive to said at least one drive mechanism during collapse and expansion of said vertically collapsible frame.

14. The method of claim 10, further comprising providing vertically aligned plates connected by collapsible vertical alignment guide bars at said vertically collapsible frame.

15. The method of claim 14, further comprising providing sleeves, said collapsible vertical alignment guide bars insertable in said sleeves in order to collapse and expand said vertically collapsible frame.

16. The method of claim 14, further comprising providing a housing having an orifice for drawing through said at least one drive mechanism.

17. The method of claim 10, further comprising providing fly weights for causing said electrical generator to rotate constantly during transition between collapsing and expanding of said vertically collapsible frame.

18. The method of claim 10, further comprising providing an energy storage unit for storing the electrical energy.

\* \* \* \* \*